(No Model.)
E. SISKRON.
CONVERTIBLE COVER AND POT FOR PLANTS.
No. 561,824.
Patented June 9, 1896.
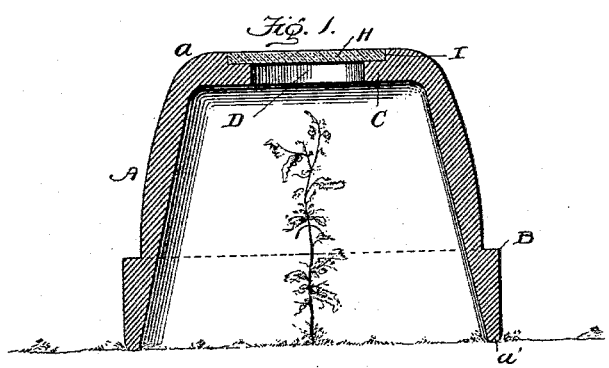
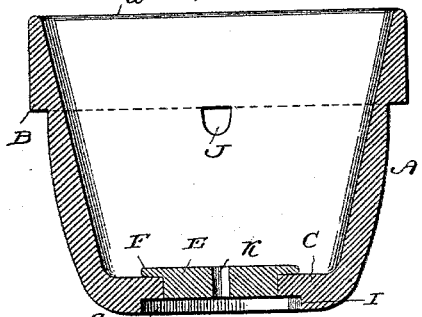
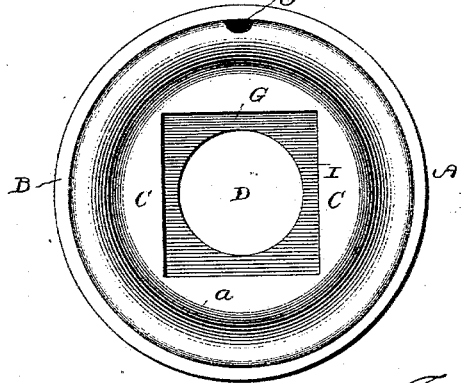
Witnesses:
Inventor.

UNITED STATES PATENT OFFICE.

EDWARD SISKRON, OF MINNEAPOLIS, MINNESOTA, ASSIGNOR TO CARRIE M. OWEN, OF SAME PLACE.

CONVERTIBLE COVER AND POT FOR PLANTS.

SPECIFICATION forming part of Letters Patent No. 561,824, dated June 9, 1896.

Application filed October 22, 1895. Serial No. 566,456. (No model.)

*To all whom it may concern:*

Be it known that I, EDWARD SISKRON, a citizen of the United States, residing at Minneapolis, in the county of Hennepin and State of Minnesota, have invented certain new and useful Improvements in Convertible Covers and Pots for Plants; and I do hereby declare the following to be a full, clear, and exact description of the invention, such as will enable others skilled in the art to which it appertains to make and use the same.

My invention relates to certain new and useful improvements in convertible covers and pots for plants and flowers; and the object of the invention is to provide an inexpensive and useful article which can be employed to cover small plants and the like to force their growth or used as a pot to hold the same.

With these and other ends in view the invention contemplates a device open at both ends and provided with an inwardly-directed flange around one end thereof, a glass plate adapted to fit within a recess formed in the flange and lie flush with the top thereof, and a removable bottom which is arranged to close the opening surrounded by said flange when the device is to be used as a pot to hold the plants, &c.

My invention consists, further, of certain details of construction and arrangements of the parts of the invention, which will be fully pointed out and claimed hereinafter.

To enable others to understand the invention more clearly, I have illustrated the same in the accompanying drawings, in which—

Figure 1 is a sectional view showing the device employed as a cover. Fig. 2 is a similar view of the device as it appears in use as a pot. Fig. 3 is a top plan view of the cover shown in Fig. 1. Fig. 4 is a detail view of the glass plate, and Fig. 5 is a detail view of the removable bottom.

Referring to the drawings, in which like letters of reference denote corresponding parts in all the figures, A designates the body of my improved device, and it may be observed here that it can be made of any desired material and in any form or size adapted for the particular plants or flowers or purposes for which it is intended and which may be consistent with my invention. I prefer, however, to construct the body of clay or other like material, which combines cheapness with stability, and which I have found particularly desirable in many ways.

In the drawings I have shown as a convenient and preferred embodiment of the invention a body provided with inclined side walls, so that one end, $a$, thereof is smaller than the other end, $a'$. To strengthen the larger end $a'$ and to form a handle for the device when used as a pot, I provide an annular shoulder B near the edge thereof. Both ends of the body are open; but the smaller end is provided with an inwardly-directed peripheral flange C, which forms a comparatively small opening D in that end of the device. When the device is used as a pot to hold plants, flowers, &c., this small opening is closed by means of the removable bottom E, which fits snugly in said opening and is provided with an outwardly-projecting flange F, adapted to rest upon the flange C and retain the bottom in its proper position; but when the device is employed as a cover for plants, &c., this bottom is removed, the body inverted in the position shown in Fig. 1, and a glass plate arranged over the opening D. A recess G, of substantially the same shape as the plate H, is formed in the outer face of the flange C, so that said plate will lie flush with the outer face of the flange C. The edges of the plate H preferably approach close to the shoulder I on the flange C, and thus the plate is retained in place and prevented from being accidentally removed from the device.

I can make the plate H and the recess G of any desired size and shape; but I prefer to proportion the opening D to the size of the body and the plants to be covered, so that just sufficient light and heat will enter the device to properly nourish the plant. One or more holes is provided to properly ventilate the device, and in the drawings I have shown one side hole J and also a hole K in the removable bottom.

The many advantages resultant from the use of my improved device must be apparent to all conversant with the art to which the same relates; but it will be particularly observed that I provide a convenient and inexpensive device which can be readily adapted for use either as a cover for plants or as a pot to hold them.

I am aware that changes in the form and proportion of parts and details of construction of the invention may be made without departing from the spirit or sacrificing the advantages of the invention, and I would therefore have it understood that I reserve the right to make all changes that fall within the scope and spirit of the invention.

Having thus fully described the invention, what I claim, and desire to secure by Letters Patent, is—

1. A convertible cover and pot for plants consisting of a body open at both ends, having an inwardly-directed flange around one opening provided with a shoulder on the outer side, a removable bottom adapted to fill the said opening when the body is used as a pot, the flange adapted to receive a glass plate within its surrounding shoulder when the device is employed as a cover, substantially as shown and described.

2. The combination with a body open at both ends, of an inwardly-directed flange around one opening, a shoulder on the outer side of said flange, and a glass plate adapted to be seated on the flange within the surrounding shoulder, and lie flush with the outer face of the shoulder, substantially as described.

In testimony whereof I affix my signature in presence of two witnesses.

EDWARD SISKRON.

Witnesses:
H. V. MERCER,
GEO. B. YOUNG.